US 11,668,536 B2

(12) United States Patent
Qi et al.

(10) Patent No.: US 11,668,536 B2
(45) Date of Patent: Jun. 6, 2023

(54) SYSTEMS AND METHODS FOR PREDICTING TUBE FOULING IN A FIRED APPARATUS, AND FOR UTILIZING TUBE FOULING PREDICTIONS

(71) Applicant: Suncor Energy Inc., Calgary (CA)

(72) Inventors: Fei Qi, Calgary (CA); Mathew Walker, Calgary (CA)

(73) Assignee: Suncor Energy Inc., Calgary (CA)

(*) Notice: Subject to any disclaimer, the term of this patent is extended or adjusted under 35 U.S.C. 154(b) by 1114 days.

(21) Appl. No.: 16/358,426

(22) Filed: Mar. 19, 2019

(65) Prior Publication Data
US 2019/0331336 A1 Oct. 31, 2019

(30) Foreign Application Priority Data
Apr. 30, 2018 (CA) .............................. CA 3003072

(51) Int. Cl.
F28G 15/00 (2006.01)
F22B 37/56 (2006.01)
(Continued)

(52) U.S. Cl.
CPC ............ F28G 15/003 (2013.01); F22B 35/18 (2013.01); F22B 37/56 (2013.01); G01N 17/008 (2013.01); F28F 27/00 (2013.01); F28F 2200/00 (2013.01)

(58) Field of Classification Search
CPC .......... F22B 35/10; F22B 35/18; F22B 37/26; F22B 37/56; F28F 19/00; F28F 27/00; F28F 2200/00; F28G 15/003; G01N 17/008
See application file for complete search history.

(56) References Cited

U.S. PATENT DOCUMENTS 5,126,721 A * 6/1992 Butcher ................. F23N 5/242
431/13
6,062,069 A * 5/2000 Panchal ............... G01N 17/008
422/53
(Continued)

FOREIGN PATENT DOCUMENTS

| CA | 2670958 A1 | 6/2008 | |
| CN | 103729534 A | 4/2014 | |
| WO | WO-2007038533 A2 * | 4/2007 | .............. F22B 35/18 |

OTHER PUBLICATIONS

Awad, Mostafa, M.; "Fouling of Heat Transfer Surfaces, Heat Transfer—Theoretical Analysis"; Heat Transfer—Theoretical Analysis, Experimental Investigations and Industrial Systems (www.intechopen.com); 2011; Monsoura University, Faculty of Engineering, Mech. Power Eng. Dept., Egypt.
(Continued)

Primary Examiner — Eric S Ruppert
Assistant Examiner — Hans R Weiland
(74) Attorney, Agent, or Firm — CPST Intellectual Property Inc.; Brett J. Slaney

(57) ABSTRACT

The following provides a system and method to predict an indicator of tube fouling in a fired apparatus such as a boiler. Historical data can be collected when the tubing is still considered to be clean, and used to build a first model between an indicator of fouling, such as tube skin temperature, and boiler load. The actual measurement of that indicator of fouling can then be compared against the model output, such that the error between the model and measurement is considered an indication of the tube fouling. Moreover, the rate of change of the model error can be used to measure the fouling rate. Next, historical data on the fluid feed quality can be collected and together with the historical error rate change data can be combined to develop a second (Continued)

model. This second model reflects how fluid feed quality variables may affect the fouling rate over time.

35 Claims, 12 Drawing Sheets

(51) Int. Cl.
    *F22B 35/18*     (2006.01)
    *G01N 17/00*     (2006.01)
    *F28F 27/00*     (2006.01)

(56) References Cited

U.S. PATENT DOCUMENTS

| | | | | |
|---|---|---|---|---|
| 6,386,272 | B1* | 5/2002 | Starner | G01B 7/06 374/147 |
| 2005/0133211 | A1* | 6/2005 | Osborn | F28F 19/00 165/157 |
| 2006/0037399 | A1* | 2/2006 | Brown | G01N 17/008 73/579 |
| 2008/0183427 | A1* | 7/2008 | Miller | G05B 23/024 702/179 |
| 2009/0188645 | A1* | 7/2009 | Harpster | F28F 19/00 165/11.1 |
| 2009/0262777 | A1 | 10/2009 | Sakami et al. | |
| 2010/0319441 | A1 | 12/2010 | Nakano et al. | |
| 2014/0008035 | A1 | 1/2014 | Patankar et al. | |
| 2018/0051945 | A1* | 2/2018 | Hanov | F28G 15/003 |

OTHER PUBLICATIONS

Ardsomang, Tutpol et al.; "Heat Exchanger Fouling and Estimation of Remaining Useful Life"; Annual Conference of Prognostics and Health Management Society; 2013; Departments of Industrial and Systems Engineering, and of Nuclear Engineering, University of Tennessee, Knoxville, U.S.

* cited by examiner

SYSTEMS AND METHODS FOR PREDICTING TUBE FOULING IN A FIRED APPARATUS, AND FOR UTILIZING TUBE FOULING PREDICTIONS

CROSS-REFERENCE TO RELATED APPLICATION(S)

This application claims the benefit of priority to Canadian Patent Application No. 3,003,072 filed on Apr. 30, 2018, the contents of which are incorporated herein by reference.

TECHNICAL FIELD

The following relates to systems and methods for predicting tube fouling in a fired apparatus and for utilizing tube fouling predictions, for example in determining maintenance timing for the fired apparatus, or in adjusting operation of the fired apparatus.

BACKGROUND

Various industrial processes generate and/or use steam to perform certain operations, such as in manufacturing, electricity generation, etc. Steam can also be used in the recovery of hydrocarbons such as bitumen, where the steam is used to heat and decrease the viscosity of the bitumen, allowing for it to drain towards a producer well, and be produced to surface. One example of a steam-based bitumen recovery process is referred to as steam-assisted gravity drainage (SAGD). Another example of a steam-based bitumen recovery process is referred to a cyclic steam stimulation (CSS).

Steam generating apparatuses generate steam by heating an input of feed water to produce an output of steam. The "quality" of the output steam is known to be the percentage of the mass of the output stream that is in the vapour state. As such "dry steam" is considered to have a quality of substantially 100% after separation following the steam generator apparatus and before being sent to a well. In SAGD or CSS operations, once through steam generators (OTSGs) or heat recovery steam generators (HRSGs) are commonly used to generate steam that is injected into the bitumen reserve using one or more wells.

With steam generating apparatuses, such as OTSGs, and other heated or "fired" apparatuses, tube fouling is a problem that occurs due to the accumulation and formation of unwanted materials on the surfaces of the tubing in the fired apparatus. This accumulation typically occurs due to impurities in the fluid feed. There exist various approaches to monitor tube fouling by measuring parameters such as tube skin temperature, pressure drop across the tube, and stack temperature. However, these solutions tend to focus on the current state of the tube fouling, which provides only a limited view of that current state.

SUMMARY

For a fired apparatus, operable to heat fluid feeds, an indicator of fouling at a future time can be predicted based on loads applied to the fired apparatus and feed quality determined prior to determining the prediction, and based on a current load on the fired apparatus. Based on the predicted indicator of fouling, maintenance timing for the fired apparatus can be determined, and/or operating parameters of the fired apparatus can be envisioned, adjusted or otherwise controlled to influence the prediction and/or maintenance.

In one aspect, there is provided a method for determining maintenance timing for a fired apparatus operable to heat fluid feeds, the method comprising: predicting an indicator of fouling at a future time based on: i) a current fouling condition based on loads applied to the fired apparatus determined at a plurality of times prior to the predicting, ii) feed quality determined at a plurality of times prior to the predicting, and iii) a current load on the fired apparatus; comparing the predicted indicator of fouling to a predetermined threshold for that indicator; and based on the comparison, determining timing for a maintenance operation for the fired apparatus.

In another aspect, there is provided a system for enabling the determination of maintenance timing for a fired apparatus, the system comprising a processor and memory, the memory comprising computer executable instructions executable by the processor to perform the method above.

In yet another aspect, there is provided a method for operating a fired apparatus operable to heat fluid feeds, the method comprising: predicting an indicator of fouling at a future time based on: i) a current fouling condition based on loads applied to the fired apparatus determined at a plurality of times prior to the predicting, ii) feed quality determined at a plurality of times prior to the predicting, and iii) a current load on the fired apparatus; and based on the predicted indicator of fouling, adjusting at least one of: the load applied to the fired apparatus, and the feed quality, to prolong operation of the fired apparatus with the indicator of fouling below a predetermined threshold for that indicator.

In yet another aspect, there is provided a system for determining operating parameters for a fired apparatus operable to heat fluid feeds, the system comprising a processor, and a memory, the memory comprising computer executable instructions executable by the processor to perform the above method.

In yet another aspect, there is provided a method for predicting fouling of tubes in a fired apparatus operable to heat fluid feeds, the method comprising: using a first set of historical data to generate a first model between an indicator of fouling and loads applied to the fired apparatus; using a second set of historical data to generate a second model reflecting how one or more feed quality variables affect a rate of fouling over time; and using the first and second models and a current load on the fired apparatus to determine a prediction for the indicator of fouling at a future time, the prediction being indicative of a future fouling condition.

In yet another aspect, there is provided a system for predicting fouling of tubes in a fired apparatus, the system comprising a processor and memory, the memory comprising computer executable instructions executable by the processor to perform the above method.

In an implementation, wherein the indicator of fouling is a temperature, for example, a tub skin temperature or a stack temperature. In another implementation, the indicator of fouling is a pressure drop across tubing of the fired apparatus. In an implementation, the fired apparatus can be a boiler for heating feed water, and the loads applied to the boiler can comprise a feed water rate and a firing rate. In an implementation, the fired apparatus can be a heat exchanger. In an implementation, the feed quality can be indicative of at least one measured quality parameter contributing to fouling.

BRIEF DESCRIPTION OF THE DRAWINGS

Embodiments will now be described with reference to the appended drawings wherein.

DETAILED DESCRIPTION

Figure 1:
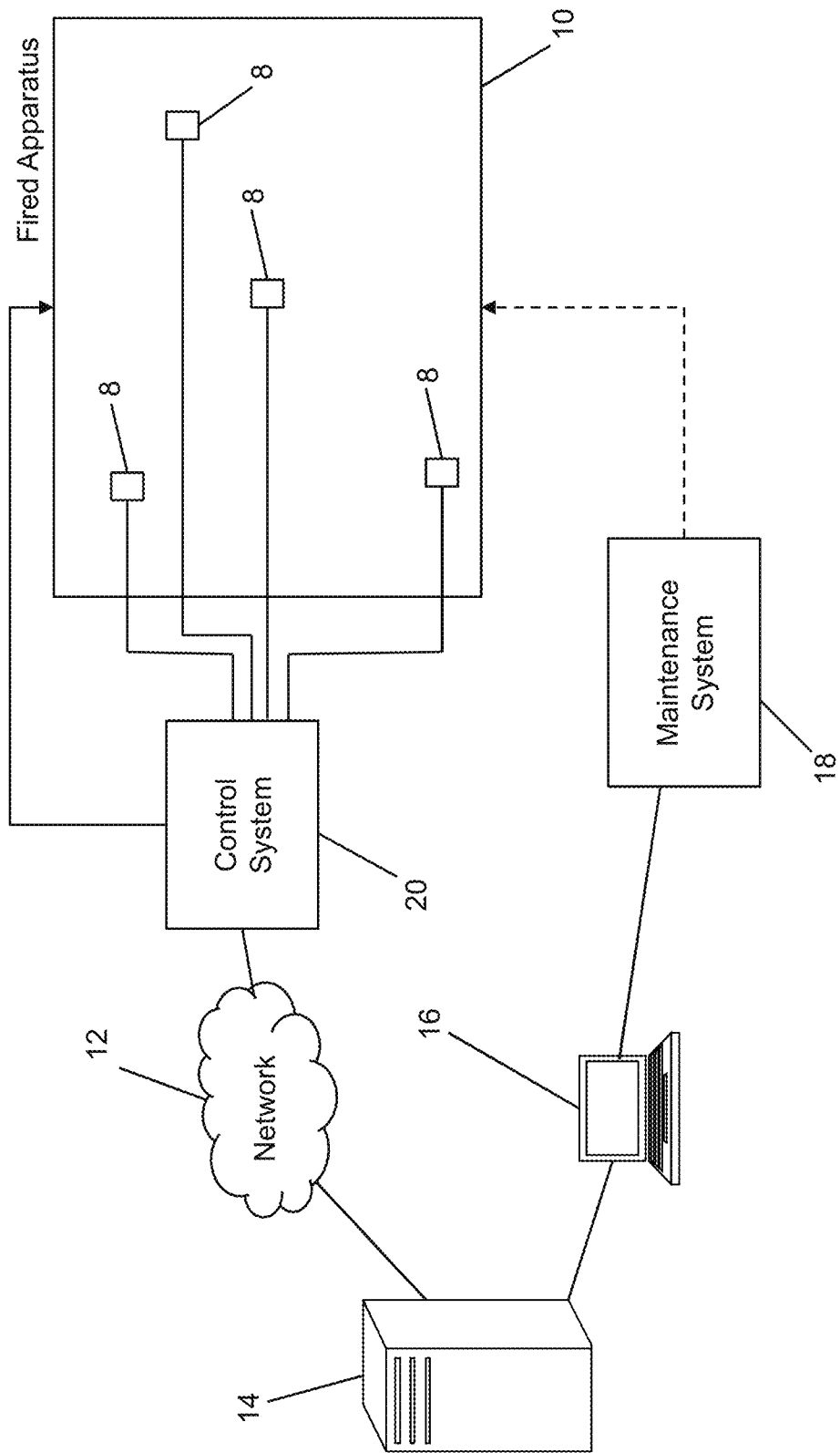
FIG. 1 is a schematic diagram of a fired apparatus and measurement system therefor.

The following provides a system and method to predict an indicator of tube fouling, such as tube skin temperature, stack temperature or pressure drop, in a fired apparatus such as a boiler.

Historical data can be collected when the tubing is still considered to be clean, e.g., after a pigging operation has been applied. This historical data can be used to build a first model between an indicator of fouling, such as tube skin temperature, and boiler load. The actual measurement of that indicator of fouling can then be compared against the model output, such that the error between the model and measurement is considered an indication of the tube fouling. Moreover, the rate of change of the model error can be used to measure the fouling rate.

Next, historical data on the fluid feed quality (e.g., feed water quality) can be collected. The fluid feed quality data, together with the historical error rate change data (for the indicator of fouling) can be combined to develop a second model. This second model reflects how fluid feed quality variables (e.g., for feed water-oil in water, silica, hardness, and iron) may affect the fouling rate over time.

With the first and second models determined using the historical data, future fouling conditions can be predicted based on current process conditions (e.g., current fluid feed quality parameters, and/or operating conditions for the fired apparatus). The operating parameters and/or maintenance schedule for the fired apparatus can consequently be optimized to extend the apparatus run time and to prevent early tube failure. In addition to such predictions, the second model can also be used to understand how adjusting the fluid feed quality can affect future fouling—i.e. "what-if" analyses. These analyses can be used as guidance to optimize apparatus operations.

While the fouling factor that is used by way of example herein is based on predicting tube skin temperatures, the principles described below used can be adapted to predict other fouling indicators, for instance, a pressure drop across the tubing, or stack temperature in a steam generator. Similarly, while examples described herein may be made in the content of a steam generating apparatus, the principles described herein can also be applied to other types of fired apparatus used to heat any fluid that has a fouling potential.

The methods described herein can remove fluctuations caused by changes to the load on the fired apparatus by normalizing the measured indicator of fouling with the apparatus load in developing the first model. The normalized temperature can provide a more accurate indication of tube fouling. The methods described herein can also correlate tube fouling rates with fluid feed quality to establish an interpretation of how fluid feed quality (e.g., feed water quality) affects tube fouling. With the identified model, the future tube fouling can be predicted based on current or assumed process conditions. This can also support performance-based apparatus maintenance planning.

Turning now to the figures, FIG. 1 provides a schematic diagram of a number of measurement points 8 applied to a fired apparatus 10. The measurement points 8 include sensors and other equipment required to collect data concerning a particular parameter, such as temperature or pressure. The data collected by the measurement points 8 can be collected by a control system 20 or other workstation or device connected to the measurement points 8. The control system 20 can be connected to a network 12 to store the collected data, as exemplified in FIG. 1, by transmitting or otherwise electronically transporting the data via the network 12 to a server device 14 for remote storage and optionally additional processing using a computing device 16 or workstation. In this example, the computing device 16 is used by an operator to review and analyze the data using, for example, a desktop computer, laptop computer, or tablet computer. The data collected via the measurement points 8 can be analyzed as herein described, to predict one or more indicators of tube fouling. The results of such analyses can be provided to a maintenance system 18 to enable maintenance operation planning. The data collected can also be used or otherwise form instructions for the control system 20 used for operating the fired apparatus 10. In this example, the maintenance system 18 and control system 20 are separate entities from personnel operating the computing device 16 and/or server 14. An operator of the computing device 16 can communicate with the maintenance system 18 via the network 12, e.g., to provide data and/or recommendations that can be used for maintenance planning.

Figure 2:
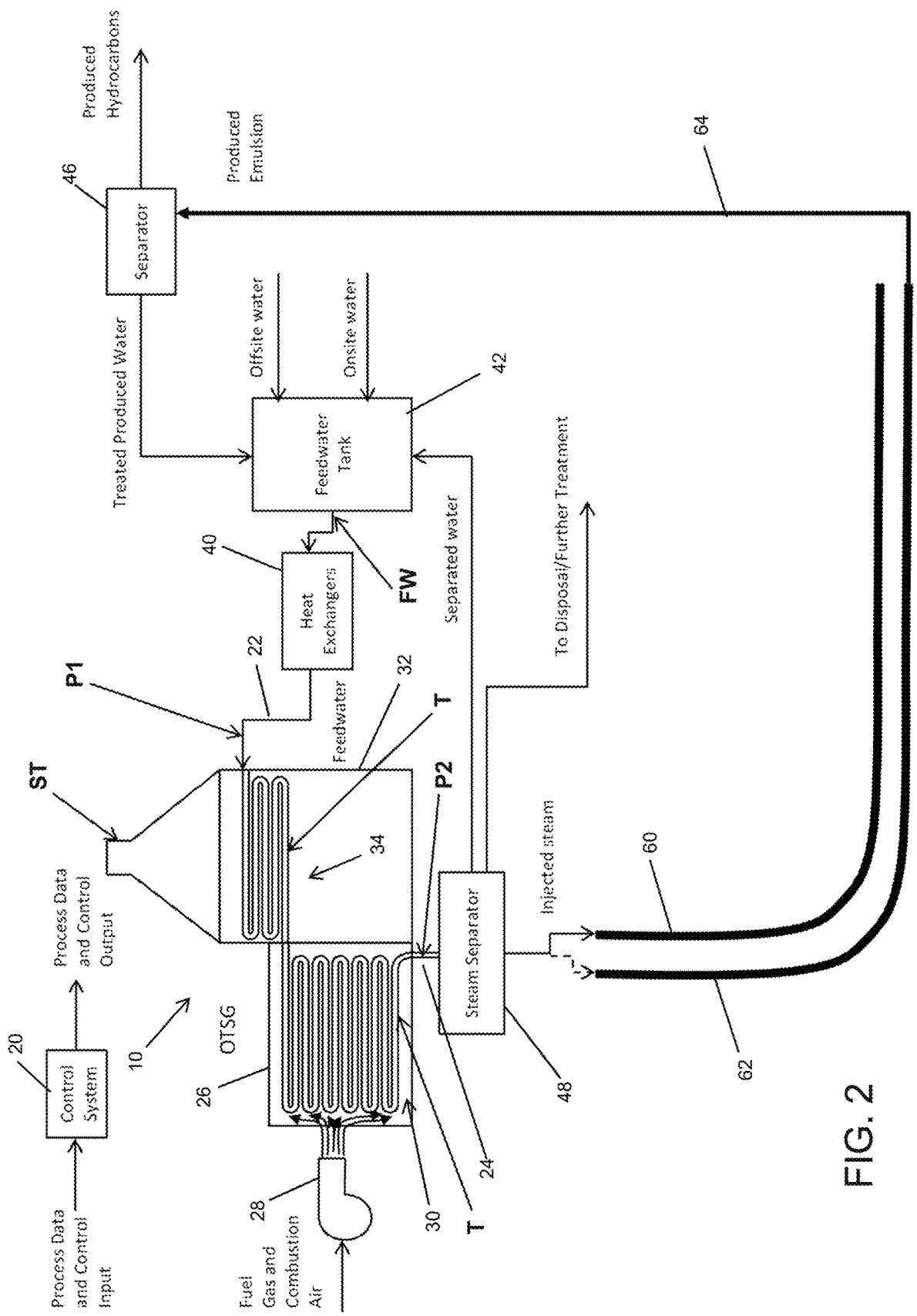
FIG. 2 is a schematic diagram of an OTSG used in a SAGD process.

To illustrate the proposed system and method for an example of a fired apparatus, FIG. 2 provides a schematic diagram of a steam generation apparatus that can be used in a steam generating implementation for a SAGD operation. It can be appreciated that certain components related to various other SAGD processing stages have been omitted from FIG. 1 for the sake of clarity and brevity. Similarly, the configuration shown in FIG. 1 is for illustrative purposes and the principles discussed herein can also be applied to other types of steam generating apparatus 10, as well as in other applications such as CSS. An OTSG-type steam generating apparatus 10 is shown which includes a radiant section 26 and an economizer 32 (also sometimes referred to as a convection section). The OTSG 10 in the configuration shown in FIG. 2 receives feed water 22 at an inlet in the economizer unit 32, which passes through an economizer tubing circuit 34, where the feed water 22 is heated and possibly partially vapourized by convective heat transfer, or a combination of convective and radiative heat transfer in the portion of the economizer that receives heat from the radiative section.

The tubing circuit 34 in this example includes multiple parallel tubing lengths with return U-bends at one or both ends as illustrated in FIG. 2. The tubing components of the tubing circuit 34 have metal walls with an interior surface that can be in contact with the feed water 22, and an exterior surface through which a heat flux from a heat source 28 can communicate to heat and evaporate the feed water 22 traveling through the tubing circuit 34 in order to generate steam.

More specifically, the tubing circuit 34 in this example directs the partially heated feed water 22 to an inlet of the radiant heat unit 26 where the partially heated feed water 22 is directed through a radiant tubing circuit 30. The radiant tubing circuit 30 is subjected to radiant heat transfer from a heat flux generated by the heat source 28 (e.g., a burner).

The quality of the steam increases as the feed water 22 passes through the economizer 32 and then the radiant heat section 26. Steam output 24 is directed through outlet tubing to a downstream circuit to a steam separator 48 wherein water is removed from the output 24 to increase the quality of the steam to a level that is suitable for SAGD operations. In the example shown, this includes steam that is of a suitable quality for injection through one or both of an injector well 60 and a producer well 62 depending on the stage of the process. That is, for example, the steam can be injected into both the injector well 60 and the producer well 62 during a start-up phase, and injected into only the injector well 60 during a production phase as is known in the art.

The feed water 22 in a SAGD process includes a source of water that is fed to process heat exchangers 40 and directed to the inlet of the economizer unit 32. The feed water 22 directed to the process heat exchangers 40 can be sourced from a feed water tank 42, which can include one or more water treatment process modules. The feed water tank 42 can be filled and replenished from a number of sources, for example, separated water from the steam separator 48, make-up water or imported make-up water from offsite, additional miscellaneous water streams from onsite if needed (e.g., pond water, backwash water, WAC regen water, etc.), and produced water. The produced water is that which is separated from the produced emulsion by a separator 46. The separator 46 receives a produced emulsion 64 from the producer well 62 and other similar wells during the SAGD process as is known in the art.

The provision of water to the OTSG and the application of heat from the heat source 28 are commonly controlled by a control system 20 to modify the feed water throughput and heat that is applied by the heat source 28. With steam generating apparatuses, such as OTSGs 10, and other heated or "fired" apparatuses, tube fouling is a problem that occurs due to the accumulation and formation of unwanted materials on the inner surfaces of the tubing in the fired apparatus. This accumulation typically occurs due to impurities in the feed water 22.

As indicated above, historical data can be collected from data collection points 8, with respect to indicators of fouling, in order to enable tube fouling predictions to be made. In FIG. 2, "T" denotes exemplary locations at which tube skin temperature measurements can be made, when tube skin temperature is used as the indicator of fouling. The identifiers "P1" and "P2" denote exemplary reference locations for which to measure a pressure drop across the OTSG 10. In this example, P1 corresponds to the pressure of the feed water 22 at the inlet, and P2 corresponds to the pressure of the steam output 24 from the OTSG 10, with P1-P2 providing the pressure drop value. The identifier "ST" in FIG. 1 denotes an exemplary location at which to measure the stack temperature of the OTSG 10.

It can be appreciated that the measurement locations identified in FIG. 2 are for illustrative purposes only, and measurements of a particular indicator of fouling can be made elsewhere. For example, various other portions of the OTSG tubing can be targeted. For example, the crossover between the economizer unit 32 and the radiant heat section 26 of the OTSG 10 can be used to measure pressure drop. Also, tube temperatures can be measured anywhere along the tube, and those illustrated in FIG. 2 represent common points of fouling in SAGD OTSGs 10. The measurements can be made using available measurement equipment such as thermocouples or thermistors (for temperature), and pressure gauges or digital sensors (for pressure). These measurements can be collected using individual and isolated data acquisition apparatus, or using integrated and/or networked devices that communicate with a central server or data storage device (not shown). As such, wired or wireless enabled devices can be used to minimize the physical collection of data stored at devices located throughout the facility. That is, the measurement collection can be performed using any number of data collection techniques.

Figure 3:
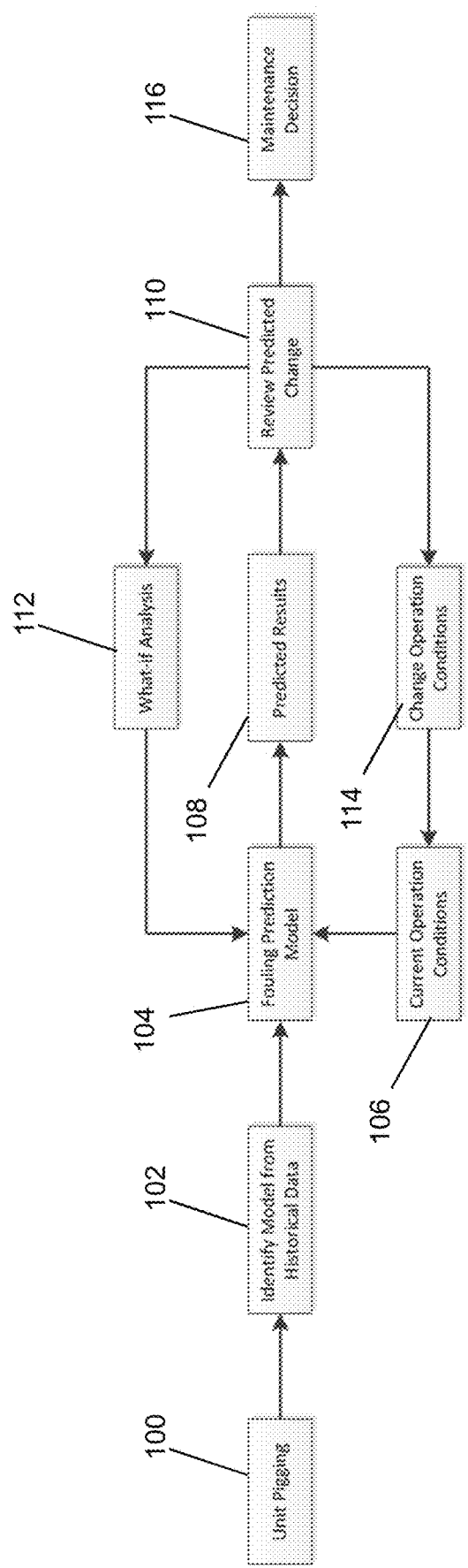
FIG. 3 is a flow diagram illustrating processes utilizing a tube fouling prediction.

FIG. 3 provides a flow diagram of a process for predicting tube fouling using data acquired from a fired apparatus such as the OTSG 10 shown in FIG. 2, and utilizing the tube fouling prediction(s) in a subsequent operation. At block 100 a unit pigging operation occurs, which involves cleaning the interior of the tubing in the fired apparatus. The pigging operation at block 100 creates a baseline condition for the tubing, since the effects of fouling are intended to be removed by the pigging operation. Historical data can then be collected at block 102 in order to identify the model between the indicator of fouling and the load on the fired apparatus, and to determine fluid feed quality. The fouling prediction model can be generated using the historical data at block 104. The fouling prediction model allows a future fouling condition to be predicted at block 108 based on current operation conditions identified at block 106. The predicted results can be reviewed at block 110, e.g., against a threshold condition, to determine if subsequent actions should or could be taken. For instance, at block 112 a "what-if" analysis can be performed in order to understand how adjusting the quality of fluid feed (e.g. feed water quality) can affect future fouling. Similarly, a review of the predicted results can be used to determine changes to the operation conditions that can be applied at block 114 to optimize performance of the fired apparatus. As also shown in FIG. 3, maintenance decisions can be made at block 116, e.g., to schedule future maintenance, or to trigger preventative actions.

Figure 4:
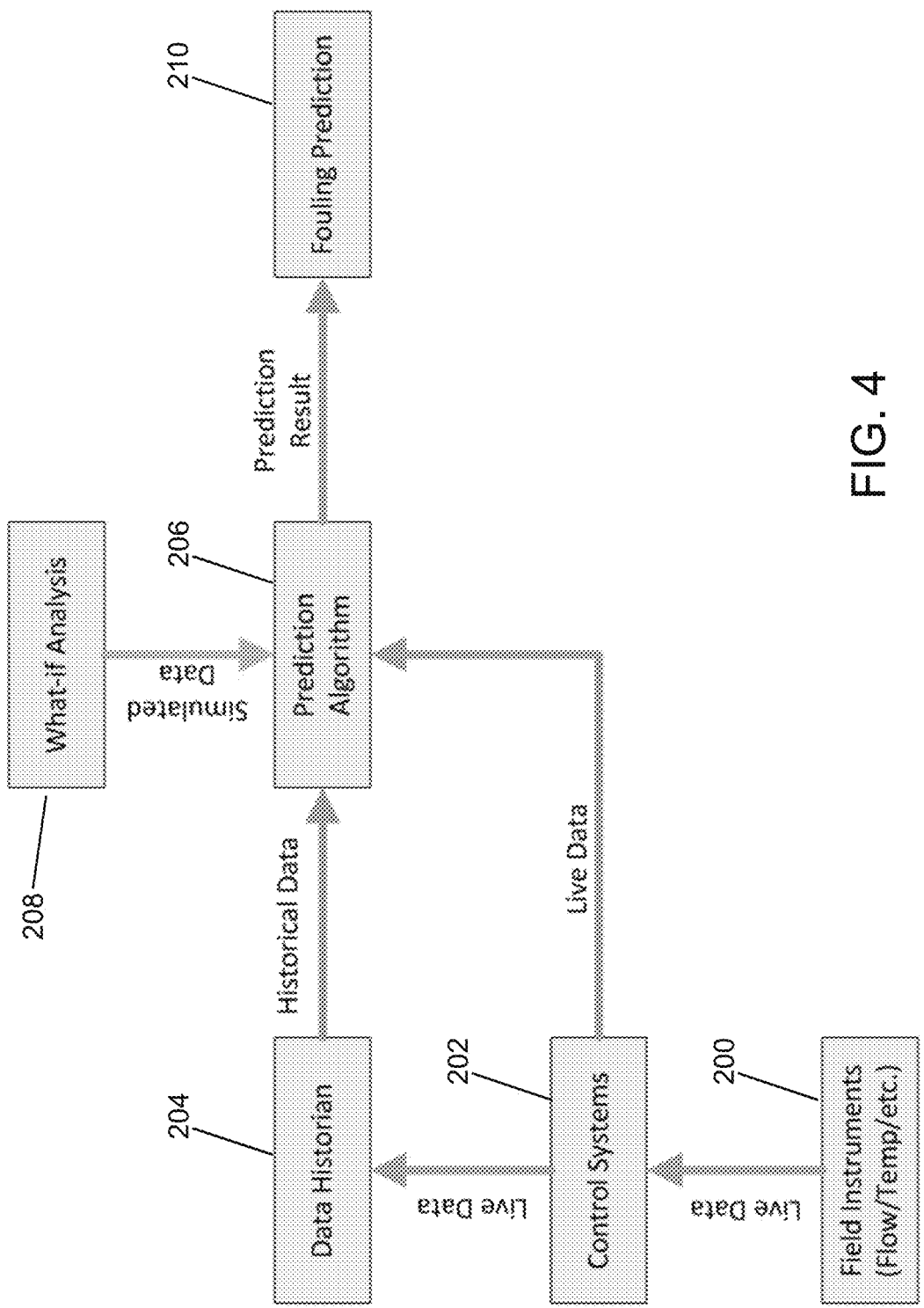
FIG. 4 is a flow diagram illustrating a data collection process for determining tube fouling predictions.

FIG. 4 provides a flow diagram illustrating data collection operations that can be implemented to collect the data for the modeling and subsequent operations shown in FIG. 3. At block 200 field instruments deployed to capture live data provide such live data to one or more control systems at block 202. The control systems at block 202 can correspond to a data acquisition, data storage, data server, or other computing solution that interfaces with the field instruments 200 and that can output the live data to both the prediction algorithm processor at block 206 and a data historian entity at block 204. The data historian entity 204 collects the live data over time in order to build the model between the indicator of fouling and loads on the fired apparatus. The live data is also provided to the prediction algorithm processor 206 to enable current process conditions to be determined. The prediction algorithm processor 206 can also be fed simulated data from a what-if analysis module 208 in order to understand how adjustments can affect future fouling, as discussed above. It can be appreciated that the what-if analysis module 208 can be implemented in a graphical user interface or otherwise in a control element capable of receiving inputs that enable the simulated data to be generated. The prediction algorithm processor 206 outputs prediction result data which can be provided to or otherwise output as a fouling prediction at block 210. For example, the fouling prediction data can be output in a report that can undergo further analyses by analysts, data scientists, maintenance staff, and operators to name a few.

Figure 5:
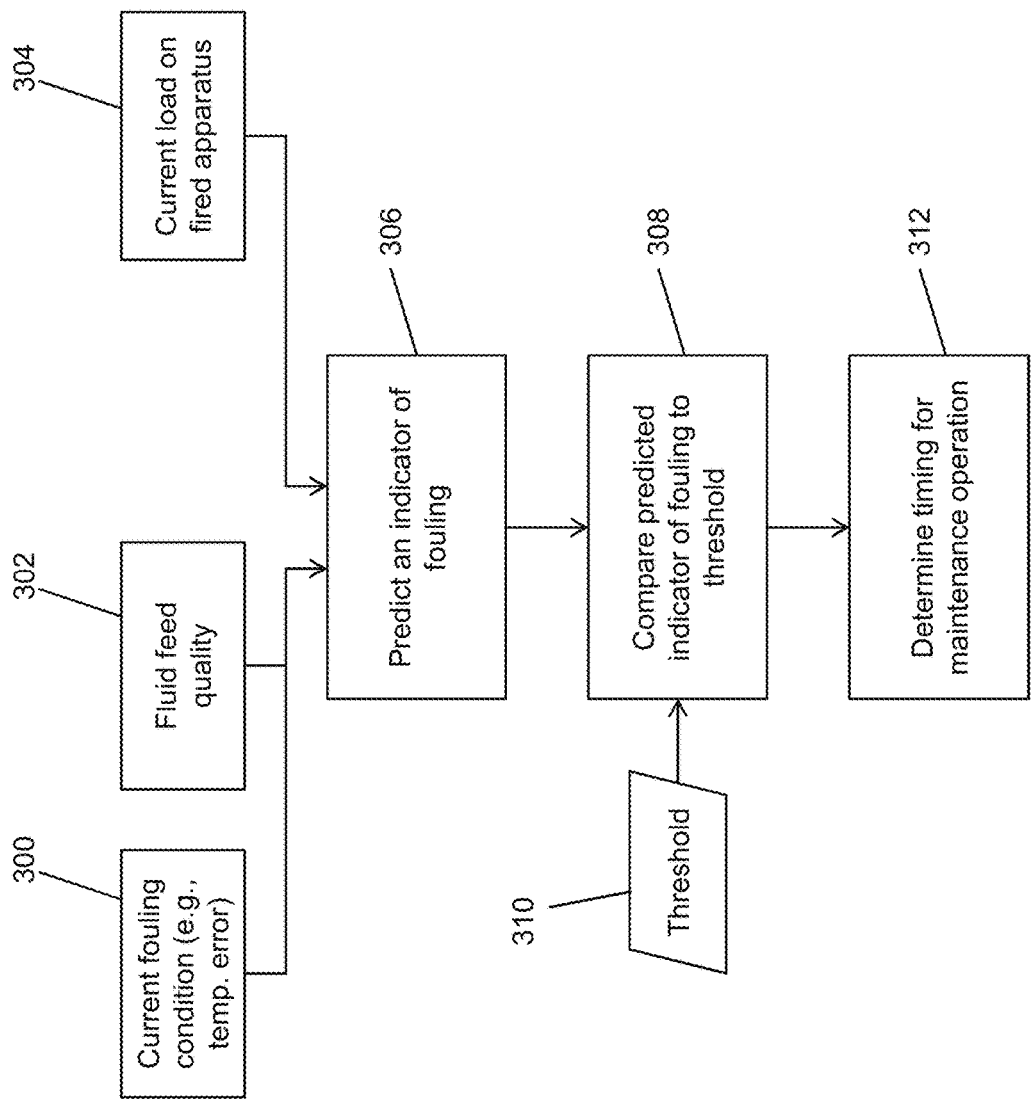
FIG. 5 is a flow chart illustrating a process for determining maintenance operation timing using tube fouling predictions.
Figure 6:
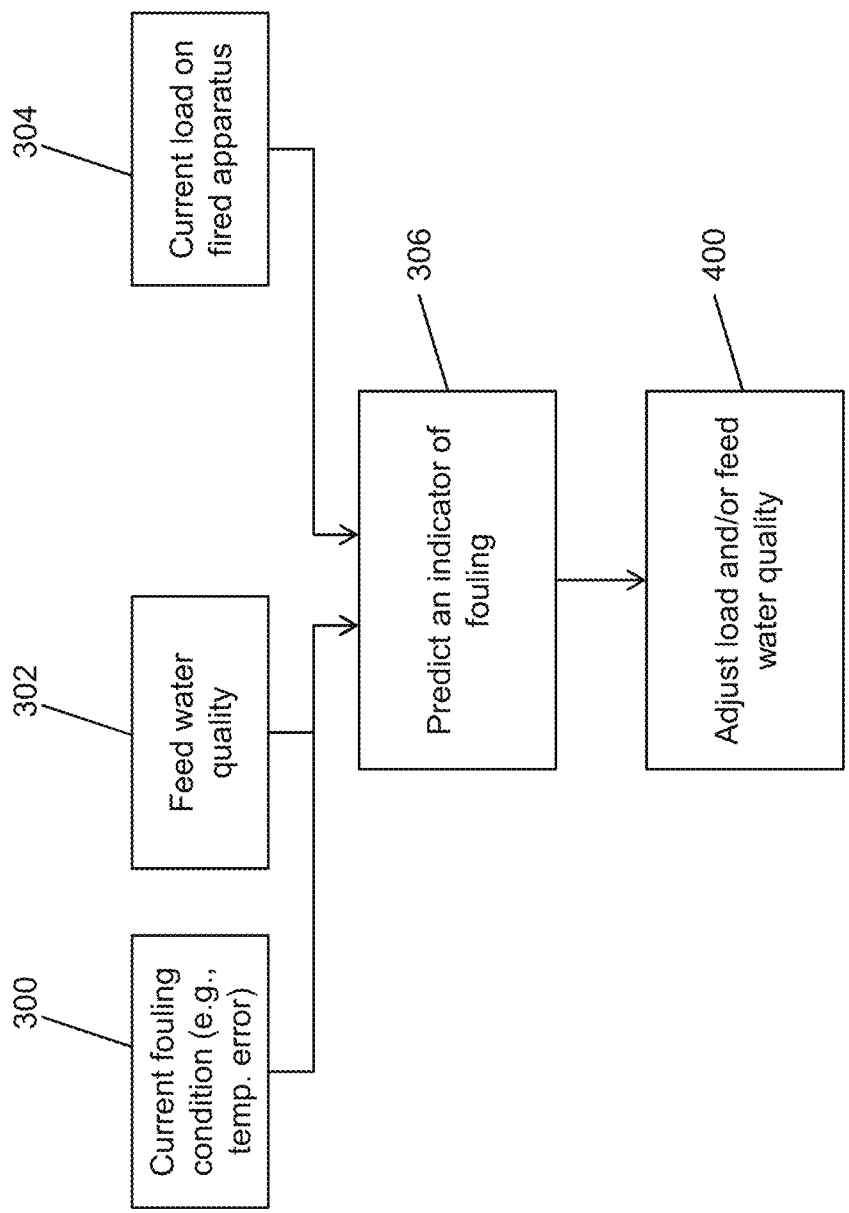
FIG. 6 is a flow chart illustrating a process for adjusting operating parameters for a fired apparatus using tube fouling predictions.
Figure 7:
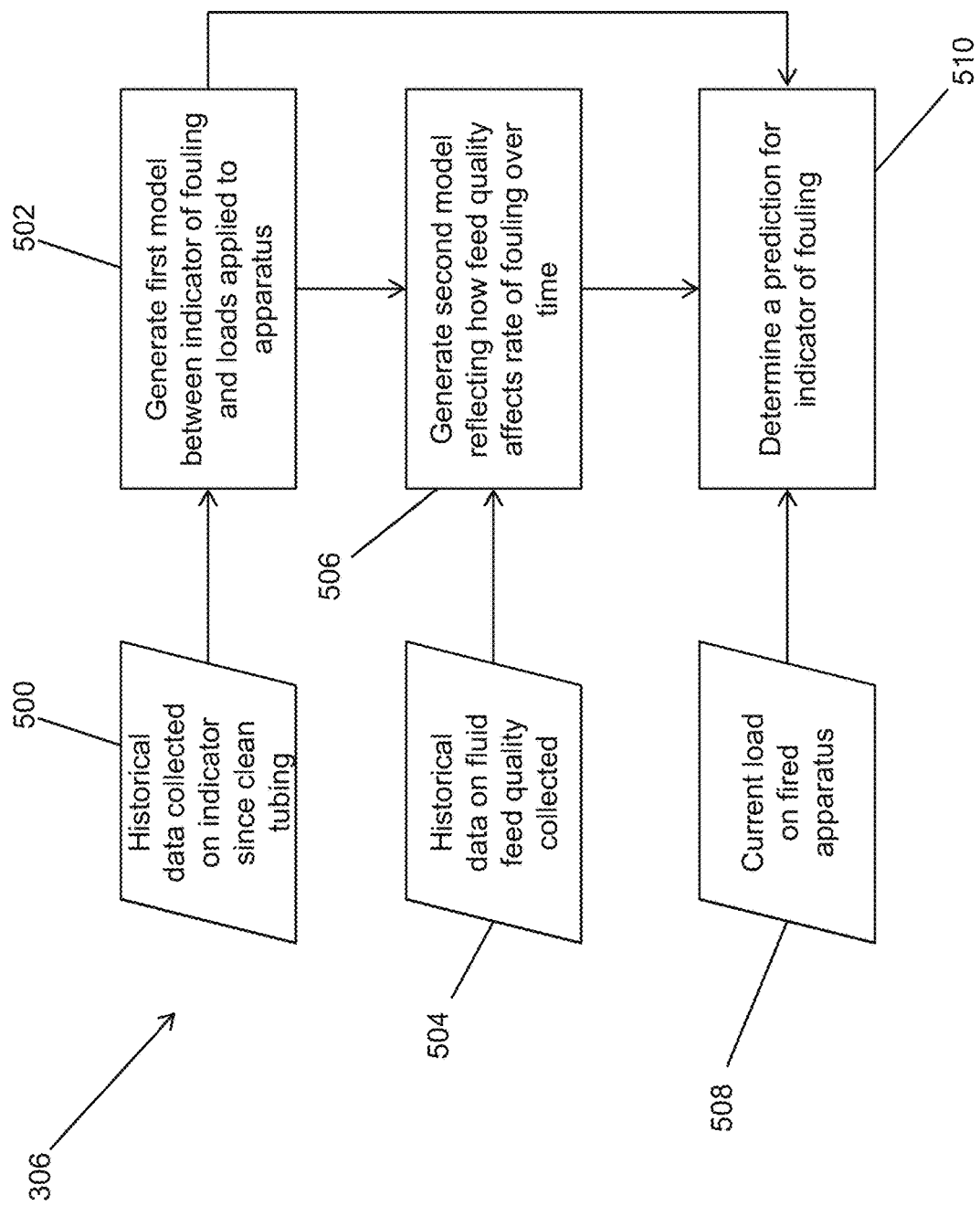
FIG. 7 is a flow chart illustrating a process for modeling tube fouling for determining predictions for such tube fouling.

FIGS. 5 to 7 provide process flow diagrams illustrating example use cases for the fouling prediction data. In FIG. 5, the current fouling condition (e.g. temperature error based on loads applied to the fired apparatus over time), is determined at step 300, fluid feed quality data is determined at step 302, and a current load on the fired apparatus is determined at step 304, e.g., according to the data collection flow shown in FIG. 3. An indicator of fouling at a future time can be predicted at step 306 based on the data determined at steps 300, 302, 304. The predicted indicator of fouling, such as a tube skin temperature or pressure drop across the apparatus at that future time is then compared to a threshold 310 at step 308. The threshold 310 can represent, for example, a maximum allowable tube skin temperature. Based on the comparison at step 308, in the example shown in FIG. 5, the timing for a maintenance operation is determined at step 312. For example, the threshold 310 can be set to trigger an inspection of a certain area of the tubing, or to plan the next pigging operation.

In FIG. 6 the steps 300-306 are similar to that shown in FIG. 5. In this example, however, the predicted indicator of fouling is used at step 400 to adjust an operating parameter of the fired apparatus, such as the load and/or fluid feed quality. For example, reducing load can reduce the rate of fouling, and/or improving fluid feed quality can similarly reduce the rate of fouling.

Turning now to FIG. 7, an implementation for determining a prediction for the indicator of fouling (e.g., at step 306 in FIGS. 5 and 6) is shown. At step 500 the historical data is collected for the indicator of fouling, over time, since the tubing has been considered "clean", e.g., subsequent to a pigging operation. This enables a first model to be generated at step 502, the first model correlating the indicator of fouling, such as temperature, to the loads that have been applied over time to the fired apparatus. At step 504 the historical data on fluid feed quality is collected. This allows, at step 506, a second model to be generated from the first model and the fluid feed quality data that reflects how feed quality affects the rate of fouling over time. Now, with a current load on the fired apparatus determined at step 508, the first and second models, can be used to determine a prediction for the indicator of fouling at step 510.

Figure 8:
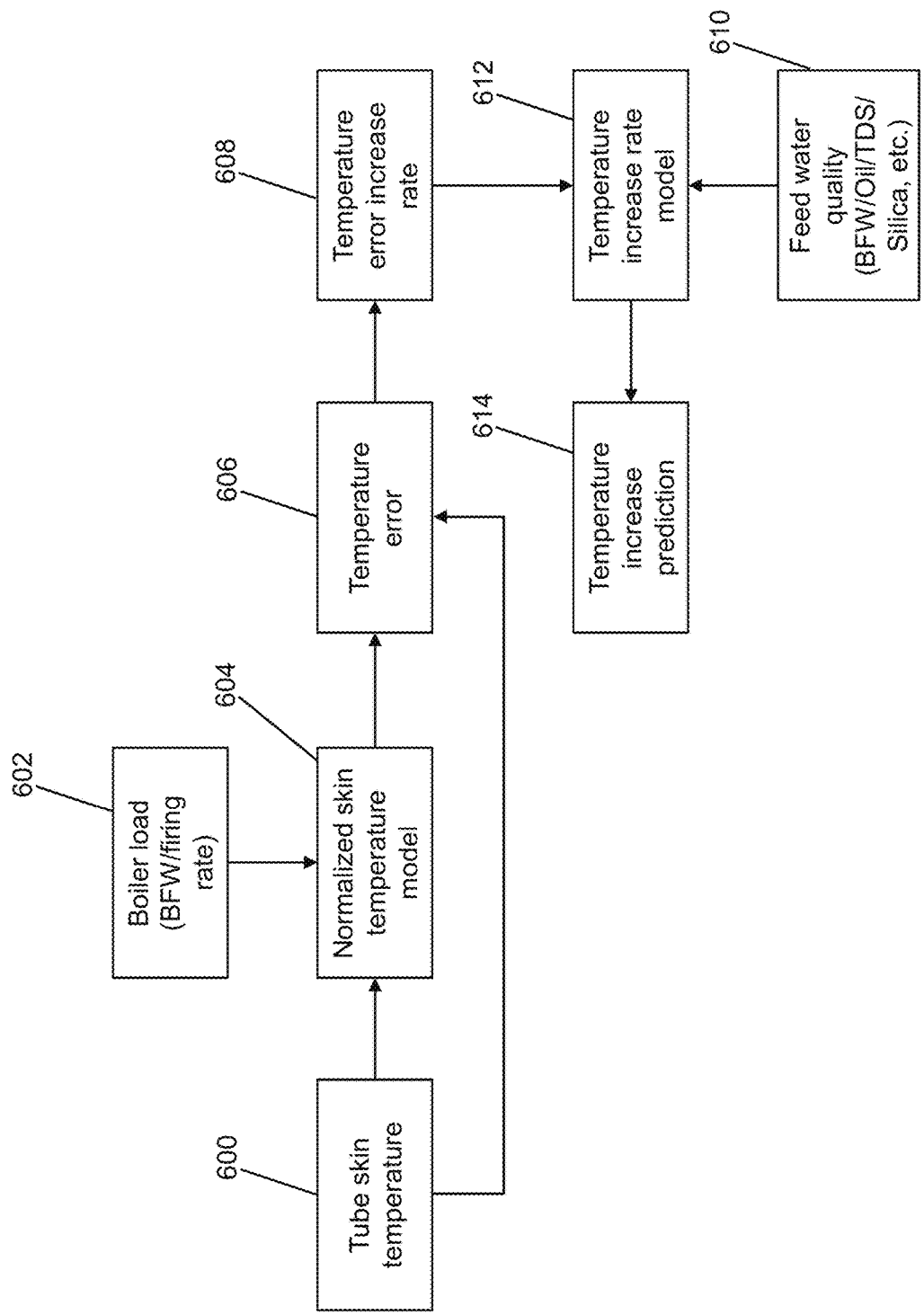
FIG. 8 is a flow chart illustrating a process for modeling tube skin temperature as an indication of tube fouling.
Figure 9:
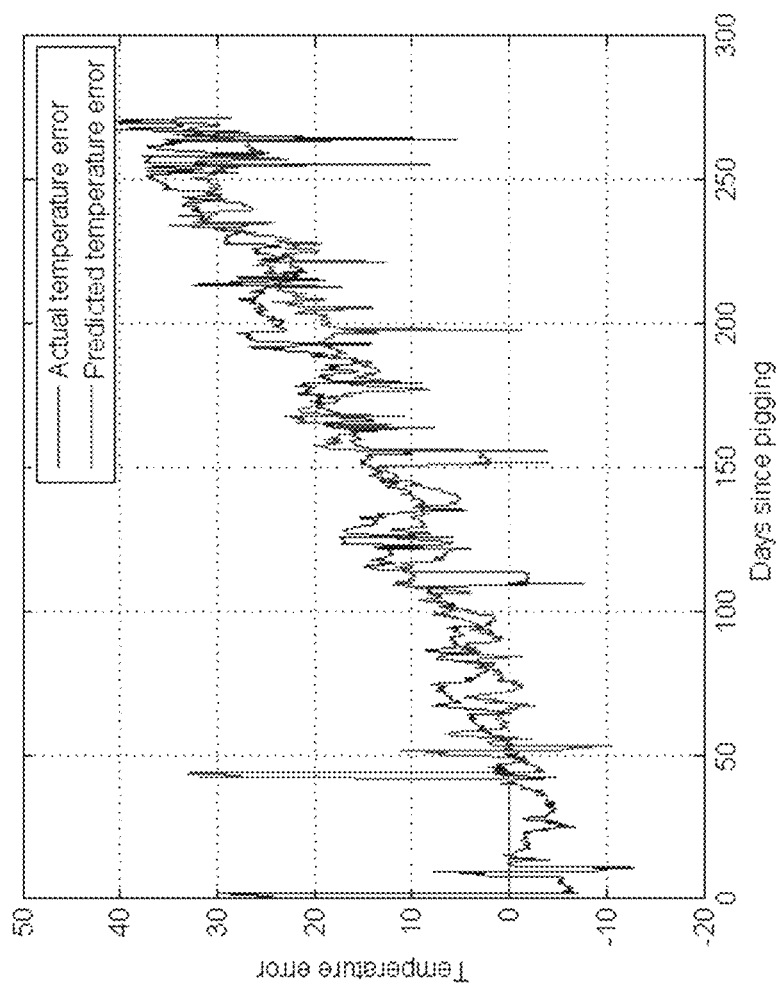
FIG. 9 is a chart providing a comparison between actual temperature error and predicted temperature error in modeling tube skin temperature as illustrated in FIG. 8.
Figure 10:
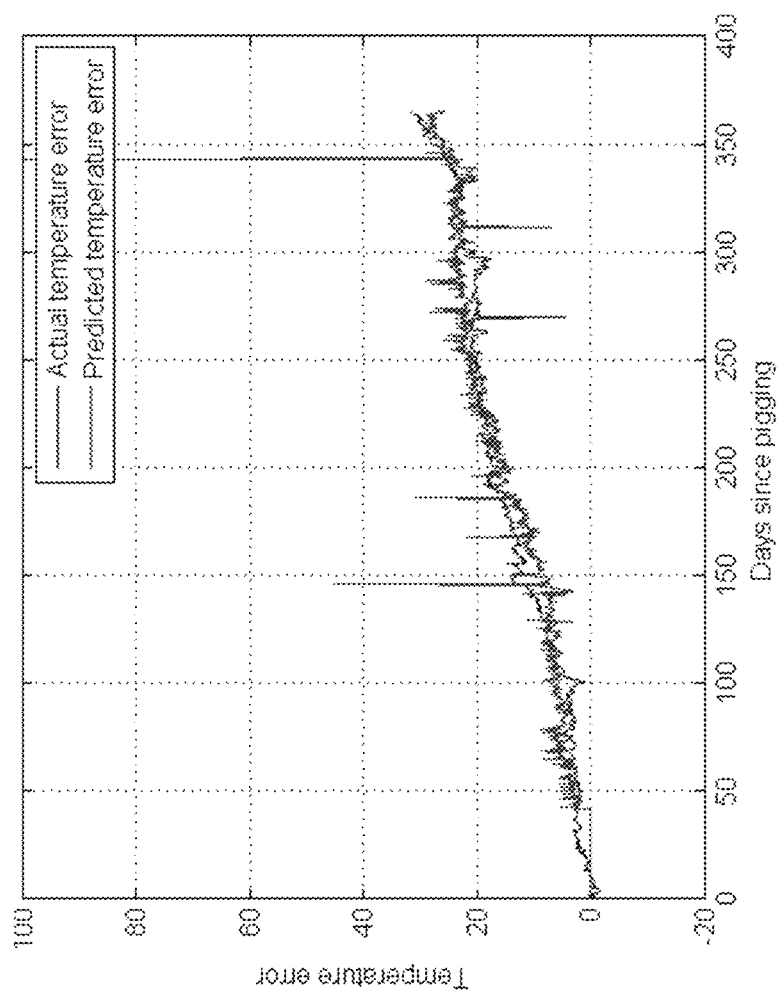
FIG. 10 is a chart providing a comparison between actual temperature error and predicted temperature error in modeling tube skin temperature as illustrated in FIG. 8.
Figure 11:
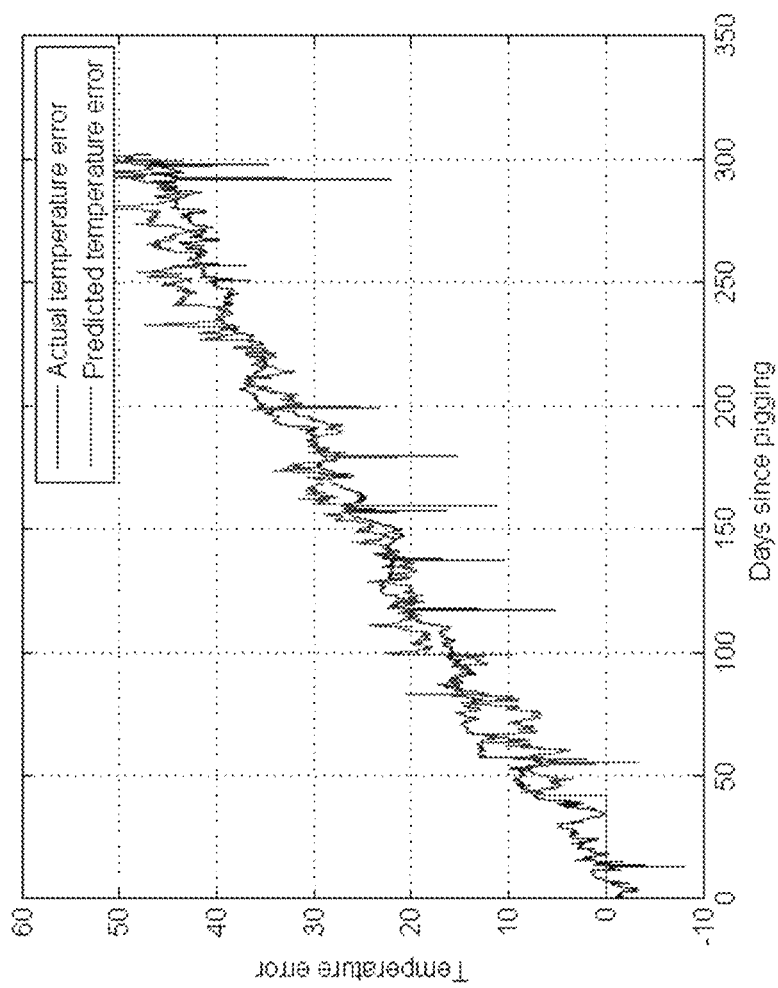
FIG. 11 is a chart providing a comparison between actual temperature error and predicted temperature error in modeling tube skin temperature as illustrated in FIG. 8.
Figure 12:
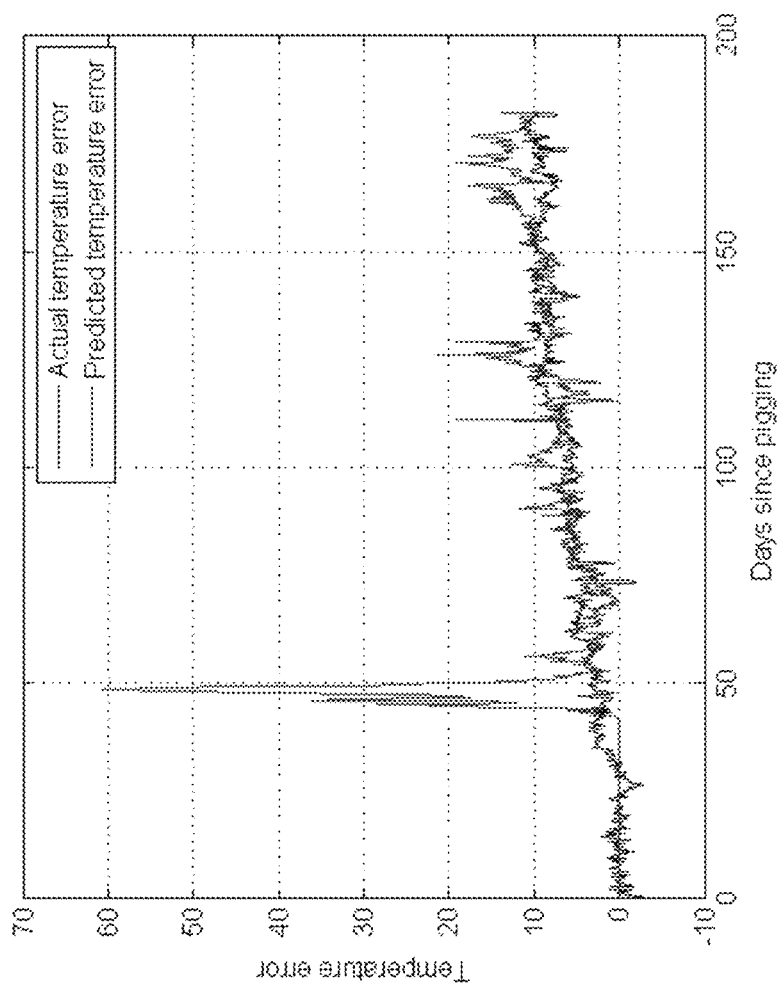
FIG. 12 is a chart providing a comparison between actual temperature error and predicted temperature error in modeling tube skin temperature as illustrated in FIG. 8.

FIG. 8 provides an example of an implementation of the process shown in FIG. 7, for modeling tube skin temperature as the indicator of fouling, in a steam generating fired apparatus. At step 600 the tube skin temperature data is collected over time, and at step 602, the boiler load is collected over time. The boiler load can include, for example, the boiler feed water (BFW) rate and/or the firing rate of the boiler. As discussed above, these data collection steps can occur subsequent to a pigging operation, or otherwise subsequent to having "clean" tubing. The historical data when the tubing is still clean is collected to build a first model, namely a normalized skin temperature model at step 604 between the tube skin temperature and boiler load. The actual skin temperature measurements taken at step 600 can then be compared against the model output to determine a temperature error at step 606. The error between the model and the measurement is considered as an indicator of tube fouling, and the rate of change of the model error, determined at step 608, can be used to measure the fouling rate. The error between the model and the measurement demonstrates that the tubing is beginning to exhibit unexpected tube skin temperatures, according to what has been modeled from historical data, therefore suggesting that tube fouling is occurring or has occurred.

At step 510, historical data on water quality is collected. The water quality data, together with the historical temperature error increase rate determined at step 608, can be combined to generate a second model, namely a temperature increase rate model at step 612. The temperature increase rate model reflects how water quality variables (such as oil in water, silica, hardness, iron, and/or other regularly sampled parameters if available) affect the fouling rate over time. From the modeling steps shown in FIG. 8, a temperature increase prediction can be made at step 614. That is, with the models identified from historical data, future fouling conditions can be predicted based on current process conditions. For example, in this example, current water quality parameters and steam generator operating conditions such as the boiler feed water rate and/or firing rate can be used to determine a temperature increase prediction. As discussed above, thresholds can be established to determine, for example, a predetermined maximum temperature for the tubing. This allows a steam generator maintenance schedule to be optimized to extend the steam generator run time on the one hand, or to prevent early tube failure.

In addition to the prediction determined at step 614, the temperature increase rate model can be used to evaluate how adjusting water quality can affect future fouling, a "what-if" analysis. That is, the models shown in FIG. 8 can allow an analyst to create hypothetical scenarios to predict how changing current conditions would likely affect the operation of the apparatus in the future. Such what-if analyses can also be used as guidance to optimize steam generator operations, such as the level of quality of feed water that can be used, or the boiler load parameters.

It can be appreciated that the approach shown in FIGS. 7 and 8 can address tube skin temperature fluctuations that are caused by boiler load change. That is, the process described herein can remove fluctuations by normalizing the temperature with the boiler load when generating the first, normalized skin temperature model at step 604. The normalized temperature has been found to provide a more accurate indicator of tube fouling. It can be appreciated that for other indicators of fouling, such normalization would also be used. Moreover, the input variables would vary based on the indicator of fouling.

The process described herein can also address difficulties in quantifying the impact of process variables on tube fouling, by correlating the tube fouling rate with the boiler feed water quality to establish a statistical model, namely the temperature increase rate model at step 612. This model can establish a discernible interpretation of how water quality affects tube fouling.

The process described herein can therefore address traditional challenges in predicting future tube fouling, by having established models based on historical data that allow future tube fouling to be predicted based on current or assumed process conditions. In addition to predicting future tube skin temperatures and comparing those predictions against thresholds (e.g., predetermined maximum temperatures), the aforementioned hypothetical scenarios and maintenance scheduling can be facilitated.

An example of a structure for the model generation shown in FIGS. 7 and 8 is provided below, along with input tags for tube fouling prediction on a set of four OTSG units 10.

The modeling includes two parts, namely, a real time temperature error calculation, and a prediction of future temperature error. The prediction of future temperature error in this model structure updates when new lab samples are available.

Example Implementation of a Temperature Error Model

An equation for determining the model, for illustrative purposes only, is as follows:

$$T_{Error}(t) = T(t) - a_1 \cdot BFW(t) - a_2 FR(t) - a_3;$$

where $a_i$, i=1, 2, 3 are model parameters; t denotes current time; BFW(t) is the current boiler feed water flow, and FR(t) is the current firing rate; and T(t) is the average of current convection section tube skin temperature. This first stage of the modelling is preferably obtained using real-time calculations.

Example Implementation of a Temperature Error Prediction

An equation for establishing a 6-hour ahead prediction is as follows:

$$T_{Error}(t+6) = T_{error}(t) + \left\{ b_1 \cdot BFW(t) \cdot Oil(t) + b_2 BFW(t) \cdot \frac{TDS(t)}{10000} + b_3 \cdot BFW(t) \cdot \frac{Silica(t)}{100} + b_4 \cdot BFW(t) \cdot TDH(t) + b_5 \cdot BFW(t) \cdot TAH(t) + b_6 \cdot BFW(t) \cdot Fe(t)/100 + b_7 \cdot T_{error}(t) \right\} / 100$$

where $b_i$, i=1, 2, 3, 4, 5, 6, 7 are model parameters; t is current time when the prediction is updated; BFW(t) is the boiler feed water flow average in the past 6 hours; oil(t) is the oil in water lab sample; TDS(s) is the total dissolved solids sample; Silica(t) is the silica sample; TDH(t) is the total dissolved hardness sample; TAH(t) is the total acidified hardness sample; Fe(t) is the iron sample; and $T_{error}(t)$ is the output from the previously determined first stage modelling temperature.

For a prediction further than 6 hours, the equation can be recursive as follows:

$$T_{Error}(t+6 \cdot (i+1)) = T_{error}(t+6 \cdot i) + \left\{ b_1 \cdot BFW(t+6 \cdot i) \cdot Oil(t+6 \cdot i) + b_2 BFW(t+6 \cdot i) \cdot \frac{TDS(t+6 \cdot i)}{10000} + b_3 \cdot BFW(t+6 \cdot i) \cdot \frac{Silica(t+6 \cdot i)}{100} + b_4 \cdot BFW(t) \cdot TDH(t+6 \cdot i) + b_5 \cdot BFW(t+6 \cdot i) \cdot TAH(t+6 \cdot i) + b_6 \cdot BFW(t+6 \cdot i) \cdot Fe(t+6 \cdot i)/100 + b_7 \cdot T_{error}(t+6 \cdot i) \right\} / 100$$

where $T_{error}(t+6 \cdot i)$ is the model output from the previous prediction model calculation. Since boiler feed water flow and lab samples beyond the current time t are not available in this example, it is assumed that future flow and sample results are the same as the current measurement: BFW(s) =BFW(t), Oil(s)=Oil(t), and the same for all the other lab samples when s>t/6.

The prediction can be calculated from i=1 (6 hours) to 168 (6 weeks). It can be appreciated that all the prediction values should be available for plotting a prediction curve for analysis. The prediction model would only need to be calculated when new lab samples are updated or at a fixed time in this example.

It can be appreciated that the number of model parameters $b_i$ can vary based on the data being collected and the particular indicator of fouling. That is, the number of model parameters, and corresponding variables contributing to the error, vary according to the specific modeling implementation and the example above should not be considered as limiting. For example, a tube skin temperature-based indicator of fouling can have fewer or greater than seven model variables. Similarly, the number of variables used where pressure drop or tube stack temperature would vary based on the particular model being used, and data being available.

Temperature Error High Limit Calculation

Assuming that the high limit for absolute tube skin temperature is $T_{max}$, the corresponding high limit for $T_{Error}$ can be calculated as follows:

$$T_{Error\_max}(t) = T_{max} - T(t) + T_{Error}(t) = T_{max} - a_1 \cdot BFW(t) - a_2 FR(t) - a_3;$$

By way of example, $T_{max}$=550 C.

In the presence of an outlier from any process variable or bad status in process measurement, the temperature error model can stop updating and hold its last good value. For the tube skin temperature, only measurements that fall within the low and high limit should be included to calculate the average.

If any of the process variables for the temperature prediction model are out of the validity range or have a bad status in process measurement, that section of data should not be included in the summation. The model can also stop updating and hold its last good value. An example of a bad status in process measurement can be from a transmitter failing but still providing a value that is out of range, or if the control system 20 detects an abnormal reading behaviour on its own and flags that behaviour.

The graphs shown in FIGS. 9-12 illustrate the resulting predicted temperature error from the model described, plotted over top of the actual measured temperature error for the same 6 week period.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server 14, computing device 16, fired apparatus 10, network 12, maintenance system 18, control system 20, or any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method for determining maintenance timing for a fired apparatus operable to heat fluid feeds, the method comprising:
    receiving, from at least one measurement point coupled to the fired apparatus, data indicative of a current load on the fired apparatus;
    predicting an indicator of fouling at a future time based on: i) a current fouling condition based on loads applied to the fired apparatus determined at a plurality of times prior to the predicting, ii) feed quality determined at a plurality of times prior to the predicting, and iii) the current load on the fired apparatus determined from the data received from the at least one measurement point, wherein the indicator of fouling is predicted by:
        using a first set of historical data to generate a first model between the indicator of fouling and the loads applied to the fired apparatus;
        using a second set of historical data to generate a second model reflecting how one or more quality variables affect a rate of fouling over time;
        determining the current load on the fired apparatus; and
        using the first and second models and the current load on the fired apparatus to determine the prediction;
    comparing the predicted indicator of fouling to a predetermined threshold for that indicator; and
    based on the comparison, determining timing for a maintenance operation for the fired apparatus.

2. The method of claim 1, wherein the indicator of fouling is a temperature.

3. The method of claim 2, wherein the temperature corresponds to a tube skin temperature.

4. The method of claim 2, wherein the temperature corresponds to a stack temperature.

5. The method of claim 1, wherein the indicator of fouling is a pressure drop across tubing of the fired apparatus.

6. The method of claim 1, wherein the fired apparatus is a boiler for heating feed water.

7. The method of claim 6, wherein the loads applied to the boiler comprise a feed water rate and a firing rate.

8. The method of claim 1, wherein the fired apparatus is a heat exchanger.

9. The method of claim 1, wherein the feed quality is indicative of at least one measured quality parameter contributing to fouling.

10. The method of claim 9, wherein the fluid is feed water, and wherein the feed water quality is indicative of at least one of: oil in water, silica, hardness, total dissolved solids, and iron.

11. The method of claim 1, wherein the second model combines fluid quality data from the second set of historical data with a historical error change rate with respect to the indicator of fouling.

12. The method of claim 11, wherein the historical error change rate is indicative of a rate of fouling.

13. The method of claim 1, wherein the first model normalizes the indicator of fouling with the loads applied to the fired apparatus.

14. The method of claim 1, further comprising collecting the historical data subsequent to the fired apparatus having clean tubing.

15. The method of claim 14, wherein the historical data is collected subsequent to a pigging operation or other fouling removal operation.

16. A method for operating a fired apparatus operable to heat fluid feeds, the method comprising:
    receiving, from at least one measurement point coupled to the fired apparatus, data indicative of a current load on the fired apparatus;
    predicting an indicator of fouling at a future time based on: i) a current fouling condition based on loads applied to the fired apparatus determined at a plurality of times prior to the predicting, ii) feed quality determined at a plurality of times prior to the predicting, and iii) the current load on the fired apparatus determined from the data received from the at least one measurement point, wherein the indicator of fouling is predicted by:
        using a first set of historical data to generate a first model between the indicator of fouling and the loads applied to the fired apparatus;
        using a second set of historical data to generate a second model reflecting how one or more quality variables affect a rate of fouling over time;
        determining the current load on the fired apparatus; and
        using the first and second models and the current load on the fired apparatus to determine the prediction; and
    based on the predicted indicator of fouling, adjusting at least one of: the load applied to the fired apparatus, and the feed quality, to prolong operation of the fired apparatus with the indicator of fouling below a predetermined threshold for that indicator.

17. The method of claim 16, further comprising comparing the predicted indicator of fouling to the predetermined threshold for that indicator.

18. The method of claim 16, wherein the indicator of fouling is a temperature.

19. The method of claim 18, wherein the temperature corresponds to a tube skin temperature.

20. The method of claim 18, wherein the temperature corresponds to a stack temperature.

21. The method of claim 16, wherein the indicator of fouling is a pressure drop across tubing of the fired apparatus.

22. The method of claim 16, wherein the fired apparatus is a boiler for heating feed water.

23. The method of claim 22, wherein the loads applied to the boiler comprise a feed water rate and a firing rate.

24. The method of claim 16, wherein the fired apparatus is a heat exchanger.

25. The method of claim 16, wherein the feed quality is indicative of at least one measured quality parameter contributing to fouling.

26. The method of claim 25, wherein the fluid is feed water, and wherein the feed water quality is indicative of at least one of: oil in water, silica, hardness, total dissolved solids, and iron.

27. The method of claim 16, wherein the second model combines fluid quality data from the second set of historical data with a historical error change rate with respect to the indicator of fouling.

28. The method of claim 27, wherein the historical error change rate is indicative of a rate of fouling.

29. The method of claim 16, wherein the first model normalizes the indicator of fouling with the loads applied to the fired apparatus.

30. The method of claim 16, further comprising collecting the historical data subsequent to the fired apparatus having clean tubing.

31. The method of claim 30, wherein the historical data is collected subsequent to a pigging operation or other fouling removal operation.

32. A non-transitory computer readable medium comprising computer executable instructions for determining maintenance timing for a fired apparatus operable to heat fluid feeds, comprising instructions for:
 receiving, from at least one measurement point coupled to the fired apparatus, data indicative of a current load on the fired apparatus;
 predicting an indicator of fouling at a future time based on: i) a current fouling condition based on loads applied to the fired apparatus determined at a plurality of times prior to the predicting, ii) feed quality determined at a plurality of times prior to the predicting, and iii) the current load on the fired apparatus determined from the data received from the at least one measurement point, wherein the indicator of fouling is predicted by:
  using a first set of historical data to generate a first model between the indicator of fouling and the loads applied to the fired apparatus;
  using a second set of historical data to generate a second model reflecting how one or more quality variables affect a rate of fouling over time;
  determining the current load on the fired apparatus; and
  using the first and second models and the current load on the fired apparatus to determine the prediction;
 comparing the predicted indicator of fouling to a predetermined threshold for that indicator; and
 based on the comparison, determining timing for a maintenance operation for the fired apparatus.

33. A system for enabling the determination of maintenance timing for a fired apparatus, the system comprising a processor and memory, the memory comprising computer executable instructions executable by the processor for:
 receiving, from at least one measurement point coupled to the fired apparatus, data indicative of a current load on the fired apparatus;
 predicting an indicator of fouling at a future time based on: i) a current fouling condition based on loads applied to the fired apparatus determined at a plurality of times prior to the predicting, ii) feed quality determined at a plurality of times prior to the predicting, and iii) the current load on the fired apparatus determined from the data received from the at least one measurement point, wherein the indicator of fouling is predicted by:
  using a first set of historical data to generate a first model between the indicator of fouling and the loads applied to the fired apparatus;
  using a second set of historical data to generate a second model reflecting how one or more quality variables affect a rate of fouling over time;
  determining the current load on the fired apparatus; and
  using the first and second models and the current load on the fired apparatus to determine the prediction;
 comparing the predicted indicator of fouling to a predetermined threshold for that indicator; and
 based on the comparison, determining timing for a maintenance operation for the fired apparatus.

34. A non-transitory computer readable medium comprising computer executable instructions for determining operating parameters for a fired apparatus operable to heat fluid feeds, comprising instructions for:
 receiving, from at least one measurement point coupled to the fired apparatus, data indicative of a current load on the fired apparatus;
 predicting an indicator of fouling at a future time based on: i) a current fouling condition based on loads applied to the fired apparatus determined at a plurality of times prior to the predicting, ii) feed quality determined at a plurality of times prior to the predicting, and iii) the current load on the fired apparatus determined from the data received from the at least one measurement point, wherein the indicator of fouling is predicted by:
  using a first set of historical data to generate a first model between the indicator of fouling and the loads applied to the fired apparatus;
  using a second set of historical data to generate a second model reflecting how one or more quality variables affect a rate of fouling over time;
  determining the current load on the fired apparatus; and
  using the first and second models and the current load on the fired apparatus to determine the prediction; and
 based on the predicted indicator of fouling, adjusting at least one of: the load applied to the fired apparatus, and the feed quality, to prolong operation of the fired apparatus with the indicator of fouling below a predetermined threshold for that indicator.

35. A system for determining operating parameters for a fired apparatus operable to heat fluid feeds, the system comprising a processor, and a memory, the memory comprising computer executable instructions executable by the processor for:
 receiving, from at least one measurement point coupled to the fired apparatus, data indicative of a current load on the fired apparatus;
 predicting an indicator of fouling at a future time based on: i) a current fouling condition based on loads applied to the fired apparatus determined at a plurality of times prior to the predicting, ii) feed quality determined at a plurality of times prior to the predicting, and iii) the current load on the fired apparatus determined from the data received from the at least one measurement point, wherein the indicator of fouling is predicted by:
using a first set of historical data to generate a first model between the indicator of fouling and the loads applied to the fired apparatus;
using a second set of historical data to generate a second model reflecting how one or more quality variables affect a rate of fouling over time;
determining the current load on the fired apparatus; and
using the first and second models and the current load on the fired apparatus to determine the prediction; and
based on the predicted indicator of fouling, adjusting at least one of: the load applied to the fired apparatus, and the feed quality, to prolong operation of the fired apparatus with the indicator of fouling below a predetermined threshold for that indicator.

\* \* \* \* \*